J. Laird,
Knob,
№ 251, Reissued Nov. 22, 1853.
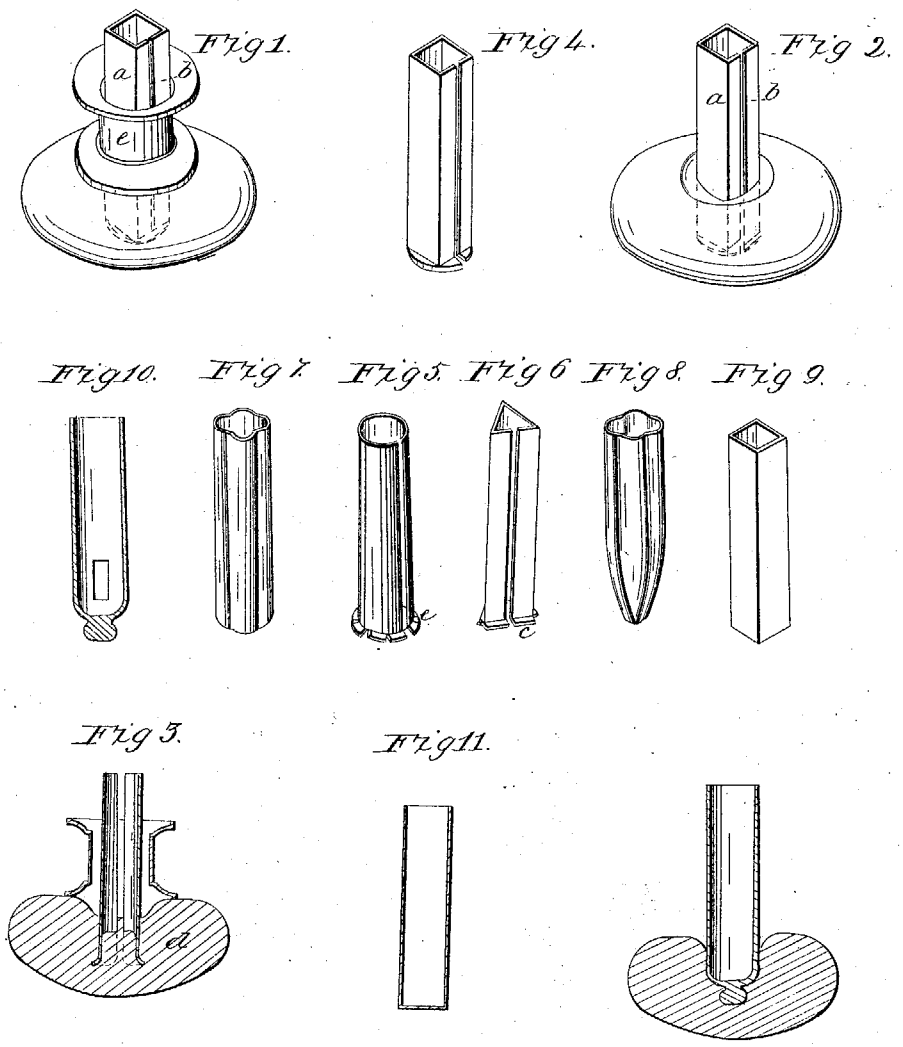
AM. PHOTO-LITHO. CO. N.Y. (OSBORNE'S PROCESS.)

UNITED STATES PATENT OFFICE.

THOMAS G. CLINTON, OF CINCINNATI, OHIO, ASSIGNEE THROUGH OTHERS OF JOSHUA LAIRD, DECEASED.

IMPROVEMENT IN ATTACHING MINERAL VITRIFIABLE MATTER TO METAL.

Specification forming part of Letters Patent No. 6,473, dated May 22, 1849; Reissue No. 251, dated November 22, 1853.

*To all whom it may concern:*

Be it known that I, THOMAS G. CLINTON, of Cincinnati, Hamilton county, Ohio, to the best of my knowledge believe that JOSHUA LAIRD, deceased, and late of said city, did invent new and useful Improvements in the Mode of Attaching Vitrifiable or other Analogous Material to Metal; and I do hereby declare the following to be a full, clear, and exact description of the same, reference being had to the annexed drawings, making part of this specification, in which drawings—

Figure 1 is an illustration of the invention as applied to door-knobs; Fig. 2 being a view of the knob without the mounting; Fig. 3, a central section; and Figs. 4, 5, 6, 7, 8, 9, 10, and 11 representing various analogous shanks.

The nature of this invention consists in a new mode of attaching vitrifiable mineral to metal—as, for instance, in manufacturing knobs for doors, furniture, or other analogous articles—by inserting metallic tubular or analogous shanks into masses of glass molded into suitable shapes and sizes, the small amount of metal in which shanks, in comparison to the bulk of mineral admissible in the construction of such articles, in addition to the characteristics incident to such shanks—viz., thickness, yet stiffness sufficient to resist lateral strain, elasticity, and center vent—adapts them to this purpose, so that the articles manufactured, or, to refer more particularly to the article illustrating the invention, so that the knobs are without any under strain between the mineral and metal, and are consequently broken with difficulty either by contraction during the process or temperature or blows when in use, the contact of the mineral and metal spreading over a very large surface in proportion to the quantity of material used, and the difference of expansion between mineral and metallic matter when brought into juxtaposition in this way being dwindled in its dangerous tendency to a mere nothing.

All the difficulties which have been hitherto most prominent are avoided by using a metallic tube or an analogous shank, whether made of cast, wrought, or rolled metal. The longitudinal slit incident to making shanks out of sheet metal allows play that enables the metal to adapt itself seasonably and sufficiently to the set of the contracting glass, and is unquestionably the best mode of manufacturing mineral articles requiring a metallic attachment. The end of the tube forms a strong and tenacious head, around which the vitrified matter cools with a uniformity that leaves the articles made—for instance, door-knobs—precisely the same in size and figure, and consequently complete fellows, so that a knob is readily matched if one of a pair happens to be broken. The center vent or its equivalent also plays an important part, as by it the glass is allowed to cool at the center as well as the outside, and is also allowed room to rise up when displaced by the insertion of the shank upon the inside of the same, and thus doubles the hold the glass could otherwise have on the shank if the shank were solid. If the end of the tube is closed and slots made in its sides, or even without slots, the purpose is accomplished in an analogous but inferior manner.

When a solid shank is inserted into a mass of glass, a large percentage of the articles so made fracture in cooling, and those even which do not crack at that stage are very often left with the mineral so strained that a slight blow or change in temperature is sufficient to set in motion the tendency of the mineral to splinter, owing to the violence done to the process of crystallization by the unyielding shank. These difficulties are avoided by this invention, and to such an extent that a mass of mineral and a tube of metal can be attached together and used as a hammer and still survive a reasonable trial in that way. The quantity of metal saved by this plan is a consideration worthy of notice. It is also preferable to use rolled or sheet metal, as it is more free from burrs or irregularities than cast metal, the former being less exposed to disturbing influences or accidents in its manufacture for this purpose, and likewise furnishing a shank of at least equal strength to and greater lightness than any other kind. The slight amount of metal thus inserted so little disturbs the vitrified mineral that a skillful workman can hardly err in the quantity of mineral he should put into the mold. This is not the case, however, with the solid shank, whether cast or wrought, because differences in the bulk of the metal occur, and of course must mar the uniformity in shape and precision in size so desirable in glass knobs and other articles of similar nature and materials.

By this invention, whether the shank or metallic portion of the attachment enjoys most or all of the characteristics before mentioned the same results will be produced in a greater or lesser degree—that is, the glass will be just as strong as it would be if a shank had not been inserted in it.

In Figs. 1, 2, and 3 in the annexed drawings, *a* is a square or other shaped tube with a longitudinal slit, *b*, traversing it from end to end. It may have an upset, *c*, on the end to be inserted in the glass *d*, by which it is firmly held. The mounting *e* fits to a nicety, and that which fits one is equally suitable (though turned on a lathe) for any other. The other figures illustrate the invention.

Having thus fully, clearly, and exactly described the nature, construction, and operation of this invention, what is claimed therein as new, and for which Letters Patent are desired to be secured, is—

Attaching mineral vitrifiable matter to metal by inserting a metallic tubular shank involving the characteristics of thinness, yet stiffness enough to resist lateral strain, elasticity, and center vent, into the mineral vitrified matter, as herein described, so that the quantity of metal in proportion to the bulk of mineral admissible in the case being thus very small the vitrified mineral enjoys the capacity to embrace and attach itself to the metal without any strain in or upon itself during its crystallization, the difference between the expansibility and contractility of the metal and the mineral the one to the other being also reduced below any practically injurious degree—that is to say, the glass being just as strong with as without such a shank.

THOS. G. CLINTON.

Attest:
CHAS. GUILD,
DANIEL N. GOODHUE.